(12) United States Patent
Vietz

(10) Patent No.: US 11,065,725 B2
(45) Date of Patent: Jul. 20, 2021

(54) PIPELINE INTERNAL CENTERING DEVICE AND ASSOCIATED METHOD

(71) Applicant: VIETZ GMBH, Hannover (DE)

(72) Inventor: Alexander Vietz, Hannover (DE)

(73) Assignee: VIETZ GMBH, Hannover (DE)

( * ) Notice: Subject to any disclaimer, the term of this patent is extended or adjusted under 35 U.S.C. 154(b) by 478 days.

(21) Appl. No.: 15/768,596

(22) PCT Filed: Apr. 6, 2016

(86) PCT No.: PCT/EP2016/057529
§ 371 (c)(1),
(2) Date: Apr. 16, 2018

(87) PCT Pub. No.: WO2017/063760
PCT Pub. Date: Apr. 20, 2017

(65) Prior Publication Data
US 2019/0054577 A1 Feb. 21, 2019

(30) Foreign Application Priority Data
Oct. 16, 2015 (DE) .................... 10 2015 117 641.6
Mar. 3, 2016 (DE) .................... 10 2016 103 772.9

(51) Int. Cl.
*B23K 37/00* (2006.01)
*B23K 37/053* (2006.01)

(52) U.S. Cl.
CPC .............................. *B23K 37/0531* (2013.01)

(58) Field of Classification Search
CPC ............ B23K 37/0531; B23K 2101/06; B23K 9/0354
See application file for complete search history.

(56) References Cited

U.S. PATENT DOCUMENTS

| | | | |
|---|---|---|---|
| 3,016,856 A | 1/1962 | Cummings | |
| 3,259,964 A | 7/1966 | Engel | |
| 3,458,106 A * | 7/1969 | Valentine | ........... B23K 37/0531 228/49.3 |
| 3,461,264 A * | 8/1969 | Sims | .................... B23K 9/0284 219/60 R |
| 3,561,320 A | 2/1971 | Nelson | |
| 3,750,928 A | 8/1973 | Valentine | |
| 5,110,031 A | 5/1992 | Rinaldi | |
| 5,288,005 A | 2/1994 | Beakley | |
| 6,109,503 A | 8/2000 | Parker | |

FOREIGN PATENT DOCUMENTS

| | | | |
|---|---|---|---|
| DE | 10 2013 110371 B3 | | 2/2014 |
| EP | 0 193 812 A2 | | 9/1986 |

* cited by examiner

*Primary Examiner* — Erin B Saad
(74) *Attorney, Agent, or Firm* — W&C IP

(57) ABSTRACT

The invention relates to a pipeline internal centering device for centering a first pipe (28) relative to a second pipe (30), having a centering unit (12) for aligning the second pipe (30) relative to the first pipe (28), and having a transport device (14) for moving along a longitudinal axis (L) of the pipeline internal centering device (10). According to the invention, a rotary device (48) is provided by means of which the pipeline internal centering device (10) can be rotated about its longitudinal axis (L).

15 Claims, 5 Drawing Sheets

PIPELINE INTERNAL CENTERING DEVICE AND ASSOCIATED METHOD

The invention relates to a pipeline internal centering device for centering a first pipe relative to a second pipe, having a centering unit for aligning the second pipe relative to the first pipe, and having a transport device for moving along a longitudinal axis of the pipeline internal centering device. According to a second aspect, the invention relates to a method for producing a pipeline.

This type of pipeline internal centering device, for instance as described in U.S. Pat. Nos. 5,110,031, 3,259,964, 6,109,503, 3,750,928, 5,288,005 and 3,561,320, is used especially in the production of pipelines. They are used to prepare for the subsequent welding process by centering a pipe that is to be welded on relative to the existing section of the pipeline. The purpose of the centering is to align the pipe that is to be welded on with the existing section of the pipeline such that any deviations in the shape of the pipes cause as small a loss in quality as possible during the subsequent welding process.

Due to the number of welded joints that have to be put along a pipeline, the speed at which the welded joint can be produced is a crucial factor in the cost and construction time of the pipeline. However, since the quality of the welded seam must not be adversely affected, it has thus far only been possible to make a relatively small degree of progress in increasing productivity.

The invention aims to accelerate the construction of pipelines without incurring any loss in quality.

The invention solves the problem by way of a pipeline internal centering device according to the preamble that comprises a rotary device that can be activated, by means of which the pipeline internal centering device is rotatable about its longitudinal axis.

According to a second aspect, the invention solves the problem by way of a method for producing a pipeline containing the steps (i) centering of a first pipe relative to a second pipe by means of a pipeline internal centering device according to the invention, (ii) welding of the second pipe to the first pipe, (iii) movement of the pipeline internal centering device along its longitudinal axis using the transport device, (iv) activation of the rotary device, (v) alignment of the pipeline internal centering device by rotating it about its longitudinal axis and (vi) deactivation of the rotary device.

In the construction of pipelines, the pipes are first of all laid out. If pipes are to be bent, they should be thus bent as appropriate. The pipes are then welded together. This is not often done to all joints at the same time; rather, it is carried out along the pipeline, starting with a first pipe. During this process, the pipeline internal centering device is preferably operated inside the pipe from joint to joint, in both straight and bent pipes. The dimensions of the pipeline internal centering device are preferably such that it can pass through pipe bends whose dimensions are in accordance with the API 5L standard (American Petroleum Institute; 49 CFR 192.113; Specification for Land Pipe, as of 1 Oct. 2015), in particular with regards to the distance of the bending stages and/or the angle of the bend. In particular, the dimensions of the pipeline internal centering device are such that it can pass through a pipe whose bend radius is at least 40 times the size of the pipe diameter, wherein the bending stages are preferably no greater than 1.5°. The pipeline internal centering device is preferably designed to pass through pipelines with a diameter of at least 20 centimetres.

The advantage of the invention is that the production of the pipeline can be considerably accelerated without the risk of any loss in quality. It has been proven that known pipeline internal centering devices, when moving along their longitudinal axis, regularly rotate by a small angle along this longitudinal axis. It is assumed that this is down to imperfections and contaminations on the inside of the pipes. To date, the problem has been resolved by using a crane to partially remove the pipeline internal centering device from the pipeline in production. The pipeline internal centering device is then returned to its correct operating position and reinserted into the pipe. This process is very time-consuming and can cause damages to the pipeline internal centering device.

Pipeline internal centering devices generally not only rotate when passing through straight pipes, but especially through pipes that are bent. However, in this case the rotation is inevitable. If this pipe is then followed by a pipe with the same bending direction, the pipeline internal centering device continues to rotate until the longitudinal drive no longer works correctly. The pipeline internal centering device then often becomes jammed and, in the worst case scenario, must be mechanically released from the pipe. The pipeline internal centering device according to the invention allows for the transport device to be consistently held in the correct position.

A further advantage is that the alignment of the pipeline internal centering device is not particularly technically complex: it is sufficient to design a part of the transport device, by means of which the pipeline internal centering device can be moved along its longitudinal axis, to be moveable in the radial direction. For example, this may occur by means of a pneumatic cylinder and/or hydraulic cylinder, especially if other components of the pipeline internal centring device are also activated pneumatically and/or hydraulically. As a result, the considerable improvement in productivity is accompanied by only a small degree of additional constructive complexity.

In addition, it is advantageous that the quality of the welded joints can be increased. Due to the fact that the pipeline internal centering device can be aligned with very little effort, the alignment can be conducted on a frequent basis. The resulting lower average deviation of the radial position of the pipeline internal centering device from the pre-set operating position leads to improved reproducibility when producing the weld seams and therefore a higher quality.

Within the scope of the present description, the centering unit should be understood especially to mean a device that can be positively connected to the first pipe and the second pipe, and that is designed such that both pipes can be centered relative to one another. In particular, the centering unit is designed for the coaxial alignment of the first pipe relative to the second pipe. For example, the centering unit comprises a first centering ring for fitting into the first pipe and a second centering ring for fitting into the second pipe, wherein the first centering ring is coaxially aligned relative to the second centering ring. It is then possible to connect the first centering ring to the first pipe and the second centering ring to the second pipe such that the pipes are then centered in relation to one another. This type of centering unit belongs to the prior art and shall therefore not be described in further detail in the following. It is possible that the centering rings can be moved relative to one another by means of a motor.

The transport device should be understood especially to mean a device by means of which the pipeline internal centering device can be automatically moved along the longitudinal axis of the pipeline internal centering device. During operation of the pipeline internal centering device, which may also be referred to as pipeline internal centering, the longitudinal axis of the pipeline internal centering device corresponds to a longitudinal axis of the pipe in which the pipeline internal centering device is arranged. The transport device generally comprises at least one transport roller; however, the transport device may also comprise a caterpillar drive or another type of propulsion device.

A rotary device should be understood especially to mean a device by means of which the pipeline internal centering device can be rotated about its longitudinal axis. Of course, known pipeline internal centering devices can also be rotated about their longitudinal axis upon application of a sufficiently large torque, if the torque is so great that the transport device is moved transversely to its predetermined direction of movement. However, in contrast to this, a rotary device should be understood to mean a device that is designed such that its structure allows for a rotation about the longitudinal axis. In particular, the rotary device comprises a sliding element, for example transverse rollers or at least one sliding friction element which, on the side facing the pipe, is made of a material that has a low friction coefficient with steel, the friction coefficient being smaller than e.g. 0.1.

The transport device is preferably designed such that it can be moved into a neutral position in which the pipeline internal centering device can be rotated about its longitudinal axis by means of the rotary device, and into a transport position in which the pipeline internal centering device can be moved along its longitudinal axis by means of the transport device.

It is beneficial if the rotary device can be activated, i.e. the pipeline internal centering device comprises a drive which can be moved into a first position in which the pipeline internal centering device can be moved by means of the transport device, and into a second position in which the pipeline internal centering device can be rotated about its longitudinal axis. This drive may act on the rotary device; however, this is not necessary. According to a preferred embodiment, this drive acts on the transport device as described below.

The rotary device may—which represents one aspect of the invention—comprise a rotary drive, by means of which the pipeline internal centering device can be rotated about its longitudinal axis by way of a motor. For example, the rotary drive may have a pneumatic motor.

According to a preferred embodiment, the transport device has at least one transport roller whose rotational axis runs transverse to the longitudinal axis. The transport roller can preferably be moved radially inwards by means of a motor. In other words, the transport roller can be moved into a longitudinal transport position, which may also be referred to as a transport position, in which it bears the weight of the pipeline internal centering device, enabling it to be moved along the longitudinal axis. The transport roller can also be moved into a neutral position in which it does not bear the weight of the pipeline internal centering device and does not impair a rotation of the pipeline internal centering device about the longitudinal axis. If the at least one transport roller is in the transport position, the transport device is in the transport position. If the at least one transport roller is in the neutral position, the transport device is also in the neutral position.

The transport roller may be in direct contact with the pipe; however, this is not necessary. In particular, the transport roller may carry a chain or a belt. The chain or the belt can then run over another transport roller. In other words, the transport roller may be part of a track or belt chassis.

The centering unit and/or transport device can preferably be moved independently of the rotary device. This should be understood particularly to mean that the centering unit and/or transport device and the rotary device are designed in such a way that the centering unit can be moved into a position in which the pipeline internal centering device can be rotated about its longitudinal axis without the centering unit coming into contact with a pipe and/or coming into contact with the pipe, but at least essentially not bearing any weight. The notion that the centering unit at least essentially does not bear any weight should be understood particularly to mean that the centering unit bears less weight than the rotary device, in particular less than a third of the weight borne by the rotary device.

In other words, the centering unit can preferably be activated without the rotary device being moved. In this way, it is preferably possible that the centering unit can be moved into a position in which it does not come into contact with the pipes, wherein the pipeline internal centering device can be rotated by means of the rotary device or moved by means of the transport device.

The pipeline internal centering device preferably has a base body, the rotary device being rigidly fixed to the base body. In this case, the transport device and/or centering unit can be designed to be retractable such that the pipeline internal centering device can be rotated by the transport device and/or centering unit being inserted. If the transport device or the centering unit is retracted, the pipeline internal centering device cannot be rotated by means of the rotary device.

Alternatively or additionally, the rotary device may be activated, especially moved, independently of the centering unit. In this case, the transverse rollers of the centering unit may be moved radially inwards on outwards without having to activate the centering unit.

It is beneficial if the transport device has a drive by means of which the at least one transport roller can be moved radially inwards and outwards. The feature that the at least one transport roller can be moved radially inwards should be understood especially to mean that the movement also comprises at least one radial component. It is possible that the transport roller moves simultaneously in the circumferential direction when moving radially inwards.

The transport roller is preferably arranged below a centre of gravity of the pipeline internal centering device. This should be understood especially to mean that a plane of the centre of gravity, which runs vertically and in which the centre of gravity of the pipeline internal centering device lies, passes through the at least one transport roller. It is advantageous, but not necessary, for this plane of the centre of gravity to pass through all transport rollers. If the transport roller is arranged below the centre of gravity, it can be moved particularly easily in such a way that the rotary device is activated.

The feature that the transport roller is arranged below the centre of gravity should be understood especially to mean that there is at least one load-bearing roller for which the following applies: an angle between a distance from the centre of gravity to the contact point between the load-bearing roller and the interior wall of the pipe on one side and the vertical on the other side has a maximum value of 30°.

It is beneficial if the transport roller can be pneumatically moved in the radial direction. Many pipeline internal centering devices have pneumatic drives. Therefore, a readily available source of compressed air can be used to supply the transport roller drive with compressed air.

It is beneficial if the rotary device comprises at least three, especially at least four, transverse rollers whose rotational axes extend along the longitudinal axis of the pipeline internal centering device. The feature that the rotational axes extend along the longitudinal axis should be understood especially to mean that it is advantageous if the angle between the rotational axes and longitudinal axis is as small as possible, but that deviations are possible. The angles between the rotational axes and the longitudinal axis are preferably smaller than 10°, in particular 5°. Of course, it is possible that each rotational axis forms a different angle with the longitudinal axis. This structure of this type of rotational device is especially simple and robust, meaning that it operates reliably under the often harsh conditions on construction sites.

It is possible and represents a preferred embodiment for the transverse rollers to be fixed relative to one another and, for example, to be attached to a joint frame. It is beneficial if the transverse rollers are assembled such that they are radially immovable and collectively have an outer ring.

Alternatively or additionally, the rotary device has a drive by means of which the at least one part of the transverse rollers can be automatically moved radially inwards and outwards. In this case, the at least one transport roller may be arranged at the bottom of the pipeline internal centering device. If the at least one transport roller is inserted, the pipeline internal centering device sits on the transverse rollers. If the at least one transport roller is retracted, the pipeline internal centering devices sits on it and can be moved.

The transport roller can preferably be moved, in particular by means of a motor, into a transport position in which it at least partially protrudes above the outer ring, and into a neutral position in which it is arranged entirely within the outer ring. The outer ring is the imaginary ring of minimal diameter which radially surrounds the outside of the transport rollers and does not intersect any of the transport rollers. The outer ring diameter therefore corresponds to the interior diameter of the smallest possible pipe in which the pipeline internal centering device can be arranged when the at least one transport roller is in the neutral position.

The at least one transport roller is preferably located at such a distance from the front end—in the longitudinal direction—of the pipeline internal centering device that the pipeline internal centering device can be rotated manually. To do so, the front end can be gripped and rotated. The rotary device is preferably designed in such a way that a torque, which is needed to rotate the pipeline internal centering device, has a maximum value of 250 Newton metres when the rotary device has been activated and/or when the transport device is in the neutral position.

A centre of gravity of the pipeline internal centering device, when in its operating position, preferably lies below a centre point of the outer ring of the transport device. This renders it easier to move the pipeline internal centering device into its aligned position. It is particularly favourable if the rotary device is designed to operate as smoothly as possible such that the pipeline internal centering device moves at least partially automatically into the aligned position upon activation of the rotary device.

In the following, the invention will be explained in more detail by way of the attached drawings. They show FIG. 1a a first embodiment of a pipeline internal centering device according to the invention with an activated rotary device, FIG. 1b a longitudinal cut along A-A through the pipeline internal centering device according to FIG. 1a with an inactive rotary device and active transport device, FIG. 1c the longitudinal cut according to FIG. 1b with an active rotary device and inactive transport device, FIG. 1d a schematic view of the position of the centre of gravity and centre points of components of the pipeline internal centering device, FIG. 2 a representation, in perspective and true to scale, of the pipeline internal centering device, and FIG. 3 a further view, in perspective, of the pipeline internal centering device.

FIG. 1a shows a pipeline internal centering device 10 according to the invention, which comprises a centering unit 12 and a transport device 14. The centering unit 12 has a first centering ring 16 that comprises a number of clamping elements 18.1, 18.2, . . . (see FIG. 1b). The clamping elements 18 (any reference without a numerical suffix refers to all relevant objects) can be pushed radially outwards by a clamp drive 20.

The centering unit 12 also comprises a second centering ring 24 with clamping elements 26.1, . . . that can also be moved radially outwards by the clamp drive 20. By activating the clamp drive 20, the pipeline internal centering device 10 can be fixed to an interior surface 26 of a first pipe 28. Independently of this, the pipeline internal centering device 10 can be fixed to the interior surface 22 of a second pipe 30 by means of the centering ring 16. Both centering rings 16, 24 are coaxially arranged. The first pipe 28 and the second pipe 30 can thus be coaxially aligned relative to one another by way of the pipeline internal centering device 10.

The transport device 14 comprises a first transport roller 32.1 and a second transport roller 32.2, which are fixed to a chassis 33 and whose radial distance $r_{32}$ to a longitudinal axis L can be altered by way of a drive 34. In the present case, the drive 34 is formed of a pneumatic cylinder. FIG. 1a depicts the transport device 14 in its transport position, in which the transport rollers 32 are at the maximum radial distance from the longitudinal axis L.

The pipeline internal centering device 10 has a centre of gravity S that is located above the transport roller 32.2.

FIG. 1a also shows that the pipeline internal centering device 10 has a front cage 36 which is arranged at a front end 38 in the direction of processing B. The front cage 36 has several bars 40.1, 40.2, . . . that can be gripped by hand to produce a torque M for a rotation about the longitudinal axis L. FIG. 1a also depicts a compressed gas container 42 which, in the present case, contains compressed air for activating in particular the drive 34, as well as the clamping actuator 20.

FIG. 1b shows a cross section along the line A-A according to FIG. 1a. It should be recognised that the transport device 14 comprises a third transport roller 32.3. The transport rollers 32.2, 32.3 are arranged at the same angular distances to a perpendicular T. In other words, the absolute values of the angles $\varphi_{32.2}$ and $\varphi_{32.3}$ are the same size in the technical sense; this means that deviations from mathematical equality are possible but not desired.

FIG. 1b shows that the transport device 14 also has a drive roller 44 by means of which the pipeline internal centering device 10 can be moved along a longitudinal axis L (see figure a). FIG. 1a depicts a propulsion motor 46 which is coupled with the drive roller 44, in the present case by means of a chain drive, to drive the device. The drive roller 44 can be pushed against the interior surface 26 (see FIG. 1a) and driven radially inwards using an actuator 47.

In the position depicted in FIG. 1b, the clamping elements 18 do not come into contact with the interior surface 22. The transport device 14 is in the transport position as the transport rollers 32 and the drive roller are in their transport positions. The pipeline internal centering device 10 can therefore be moved along the longitudinal axis L by way of the transport device 14. When in the transport position, the at least one transport roller 32.2, 32.3 bears the weight of the pipeline internal centering device 10.

FIG. 1c shows the pipeline internal centering device 10 according to FIG. 1b, in which the transport device 14 is in its neutral position. The transport rollers 32 are at such a radially short distance from the centre point of the pipe 30 that they do not bear any more weight. Instead, the pipeline internal centering device 10 sits on a rotary device 48, which comprises transverse rollers 50.1, 50.2, . . . .

Each transverse roller 50 has a rotational axis $D_{50}$, which runs, at least in good approximation, parallel to the longitudinal axis L. When the transport device 14 is in its neutral position, the pipeline internal centering device 10 can be easily rotated about its longitudinal axis L on the transverse rollers 50.

The transverse roller 50 are assembled such that they are radially immovable and collectively have an outer ring K. If the transport device 14 is in its transport position, as shown in FIG. 1b, the transport rollers 32 protrude above this outer ring K. If the transport device 14 is in the neutral position, as shown in FIG. 1c, they are arranged entirely within the outer ring K.

Figure 1A:
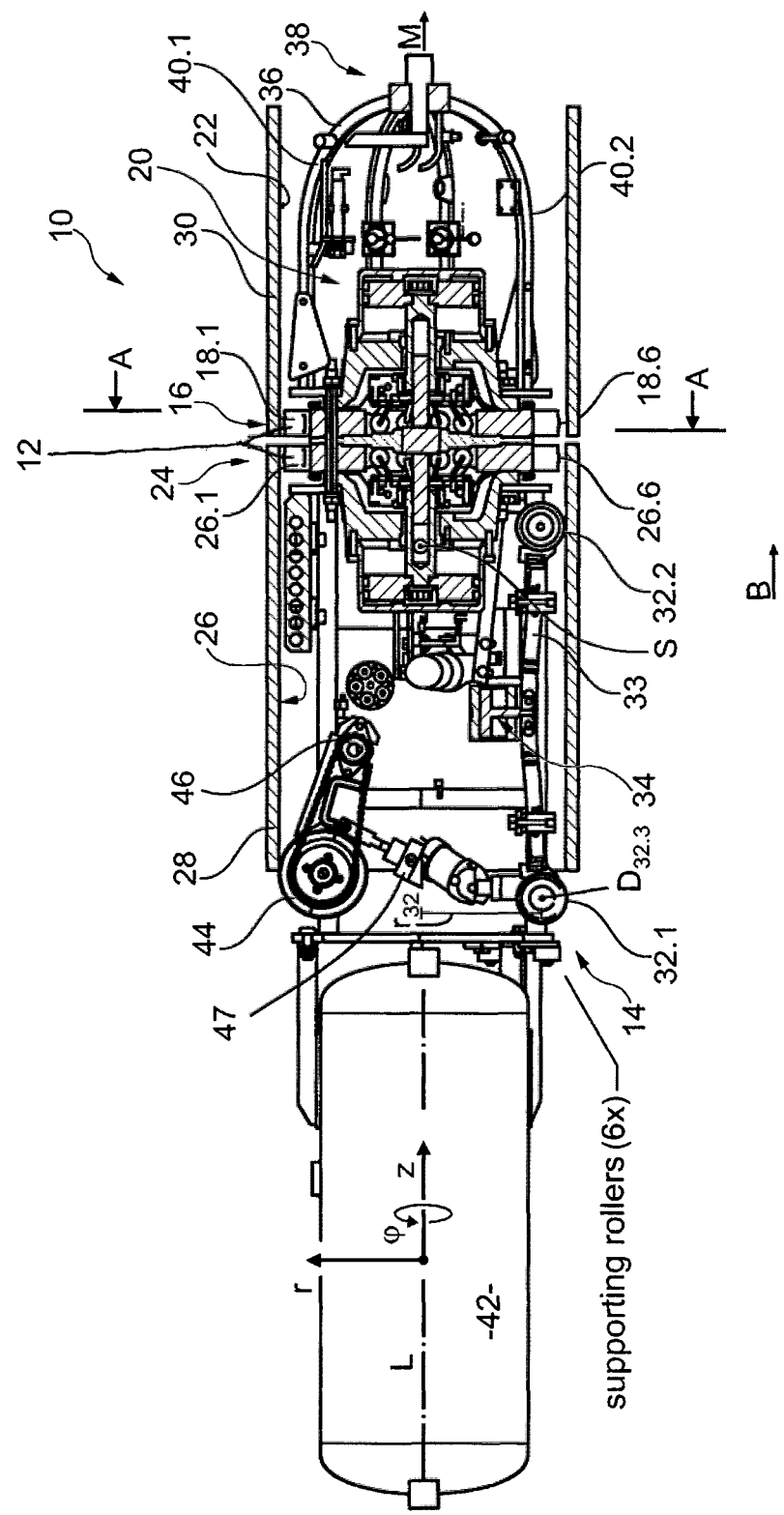
FIG. 1d depicts the position of the centre point $M_K$ of the outer ring and the centre of gravity S of the pipeline internal centering device 10.
Figure 1B:
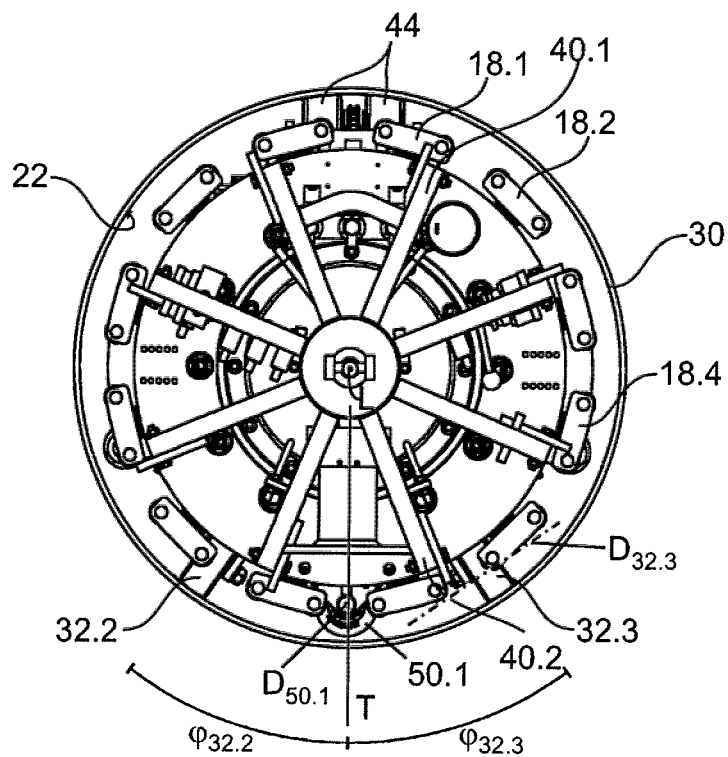
Figure 1C:
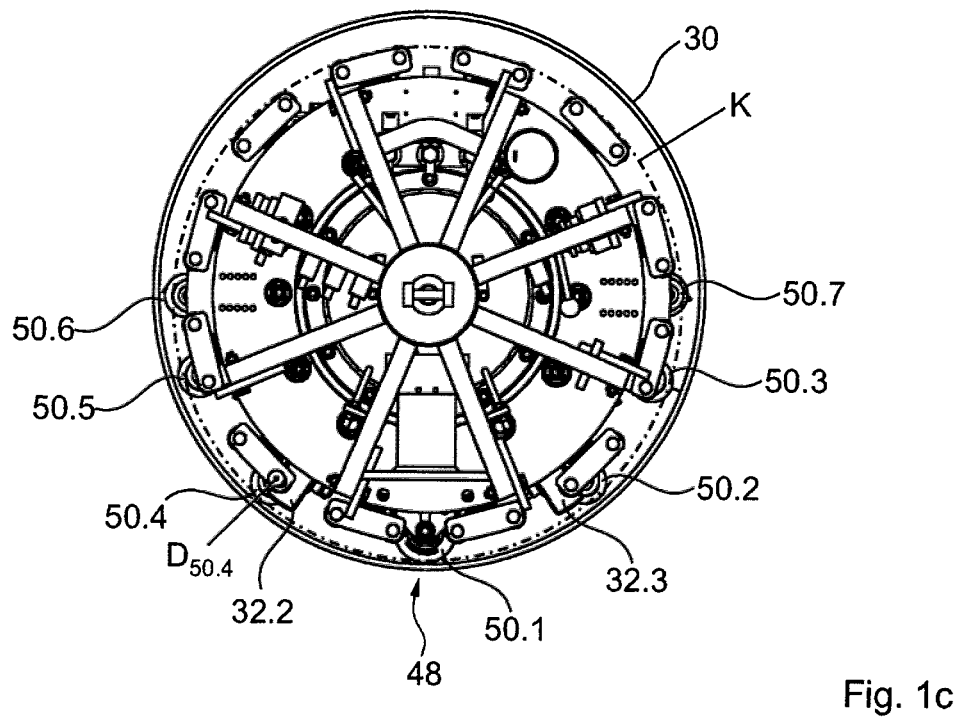
Figure 1D:
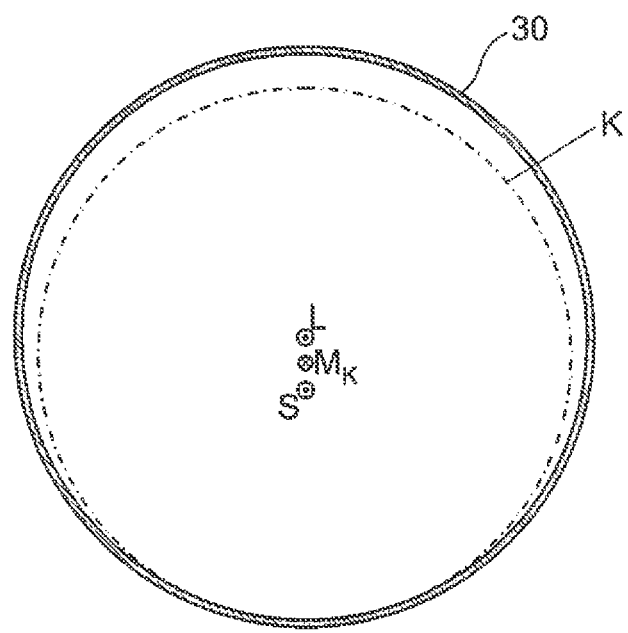
Figure 2:
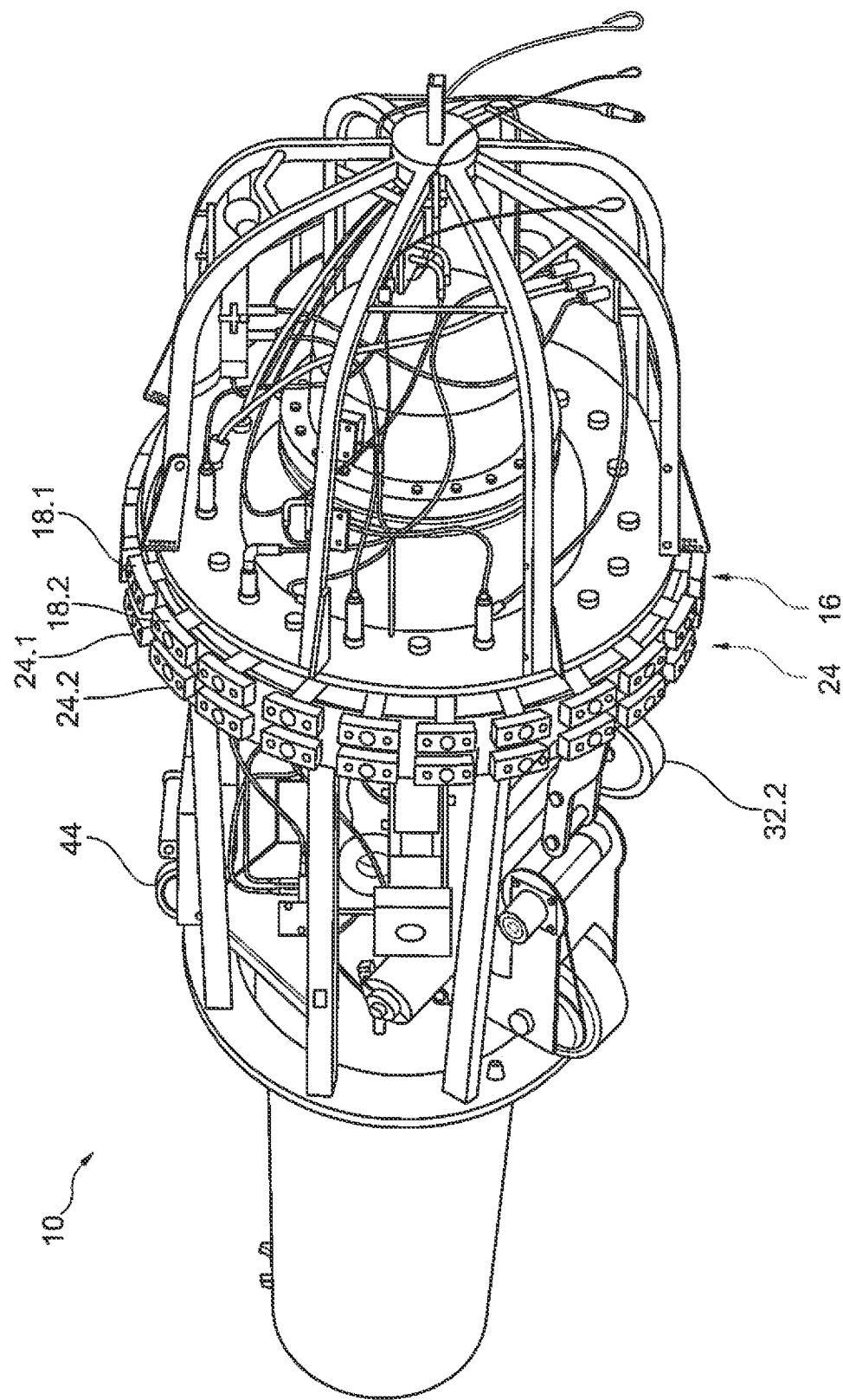
FIG. 2 depicts a view, in perspective, of the pipeline internal centering device 10.
Figure 3:
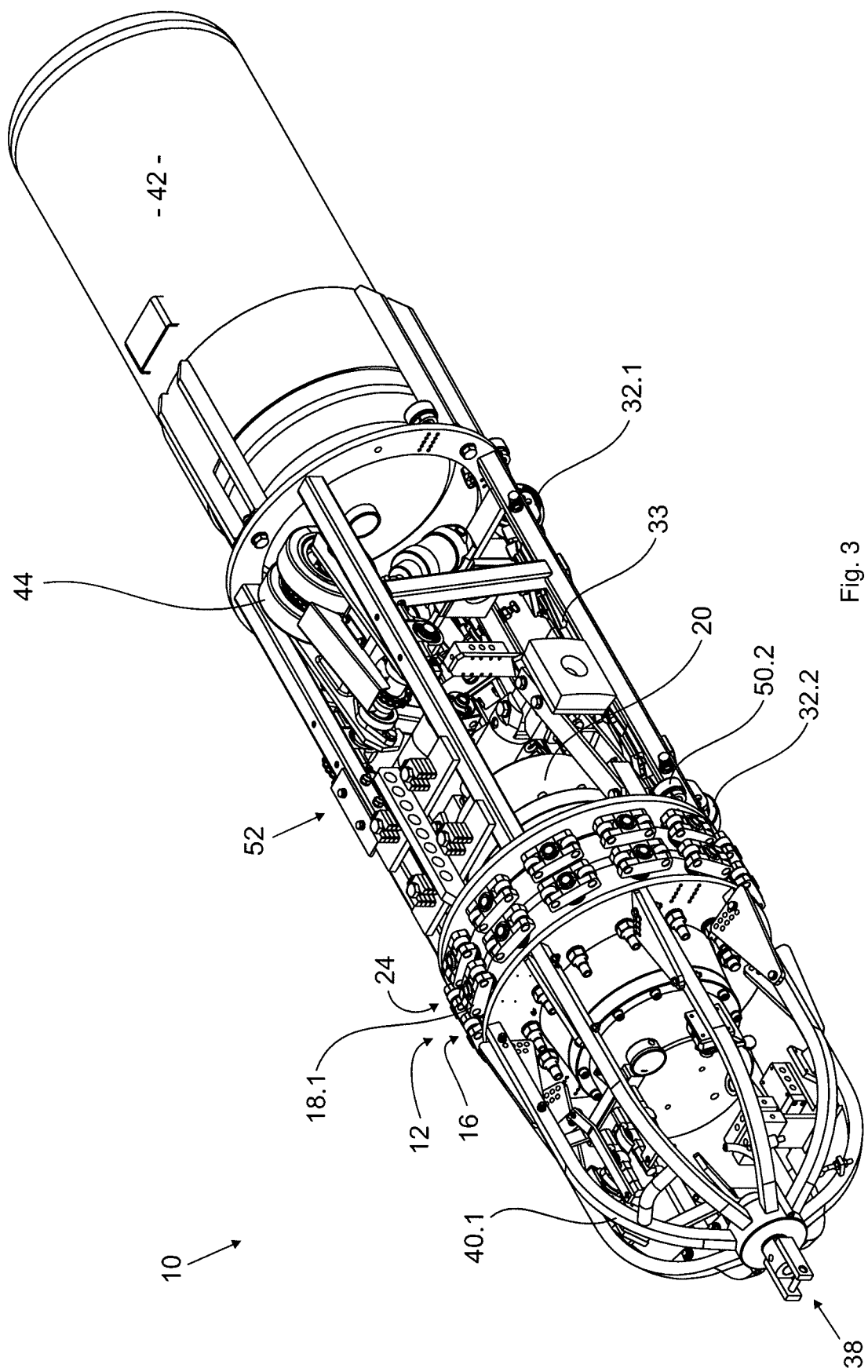

FIG. 3 shows a further view, in perspective, of a pipeline internal centering device 10 according to the invention that comprises a base body 52, to which the rotary device 48 is rigidly attached. Of course, the transverse rollers 50 may continue rotating; however, a radial movement inwards and outwards is not possible. In contrast, the transport rollers 32 are retractable relative to the base body 52.

REFERENCE LIST

| | Reference list |
|---|---|
| 10 | pipeline internal centering device |
| 12 | centering unit |
| 14 | transport device |
| 16 | centering ring |
| 18 | clamping element |
| 20 | clamp drive |
| 22 | interior surface |
| 24 | second centering ring |
| 26 | interior surface |
| 28 | first pipe |
| 30 | second pipe |
| 32 | transport roller |
| 33 | chassis |
| 34 | drive |
| 36 | front cage |
| 38 | front end |
| 40 | bar |
| 42 | compressed gas container |
| 44 | drive roller |
| 46 | propulsion motor |
| 47 | actuator |
| 48 | rotary device |
| 50 | transverse roller |

| | Reference list |
|---|---|
| 52 | base body |
| d | protrusion |
| $E_S$ | plane of centre of gravity |
| K | outer ring |
| L | longitudinal axis |
| M | torque |
| S | centre of gravity |
| T | perpendicular |

The invention claimed is:

1. A pipeline internal centering device for centering a first pipe relative to a second pipe, comprising:
  (a) a centering unit for aligning the second pipe relative to the first pipe,
  (b) a transport device for moving the pipeline internal centering device along a longitudinal axis of the pipeline internal centering device,
  (c) a rotary device for rotating the pipeline internal centering device about its longitudinal axis, and
  d) clamping elements which are moveable radially outwards by the centering unit to be braced against an interior surface of either the first pipe or the second pipe when the first pipe and second pipe are being aligned, and wherein the clamping elements are moveable radially inward to a neutral position in which one or more of the clamping elements are not braced against the interior of either the first pipe or the second pipe,
  wherein the rotary device is configured to rotate the centering unit when the clamping elements are in the neutral position.

2. The pipeline internal centering device according to claim 1, wherein the centering unit is moveable independently of the rotary device.

3. The pipeline internal centering device according to claim 1, further comprising:
  a base body,
  wherein the rotary device is rigidly attached to the base body.

4. The pipeline internal centering device according to claim 1, wherein the transport device comprises at least one transport roller
  that has a rotational axis that runs transversely to the longitudinal axis, and
  that is moveable radially inwards by a motor.

5. The pipeline internal centering device according to claim 1, wherein the transport device has at least one transport roller arranged below a center of gravity of the pipeline internal centering device.

6. The pipeline internal centering device according to 1, wherein the transport device has at least one transport roller which is moveable pneumatically and/or hydraulically in the radial direction.

7. The pipeline internal centering device according to claim 1, wherein the rotary device comprises at least three transverse rollers, each of which has a rotational axis that extends along the longitudinal axis.

8. The pipeline internal centering device according to claim 7, wherein
  (a) the at least three transverse rollers are assembled such that they are radially immovable and collectively have an outer ring, and (b) the transport device has at least one transport roller which is moveable by a motor into a transport position in which the at least one transport roller at least partially protrudes above the outer ring, and into a neutral position in which the at least one transport roller is arranged entirely within the outer ring.

9. The pipeline internal centering device according to claim 1 wherein the transport device has at least one transport roller located a distance from a front end—in the longitudinal direction of the pipeline internal centering device which is sufficient to permit the pipeline internal centering device to be rotated manually.

10. The pipeline internal centering device according to claim 8, wherein a center of gravity of the pipeline internal centering device lies below a center point of the outer ring when in the operating position.

11. A method for producing a pipeline comprising the steps:

(i) centering of a first pipe relative to a second pipe by a pipeline internal centering device according to claim 1, (ii) welding of the second pipe with the first pipe, (iii) movement of the pipeline internal centering device along a longitudinal axis by the transport device, (iv) activation of the rotary device, (v) alignment of the pipeline internal centering device by rotating the pipeline internal centering device about the longitudinal axis, and (vi) deactivation of the rotary device.

12. The method according to claim 11, wherein rotation of the pipeline internal centering device during the alignment is conducted manually.

13. The pipeline internal centering device according to claim 1, wherein the rotary device comprises at least four transverse rollers, each of which has a rotational axis that extends along the longitudinal axis.

14. The pipeline internal centering device according to claim 13, wherein (a) the at least four transverse rollers are assembled such that they are radially immovable and collectively have an outer ring, and (b) the transport device has at least one transport roller which is moveable by a motor into a transport position in which the at least one transport roller at least partially protrudes above the outer ring, and into a neutral position in which the at least one transport roller is arranged entirely within the outer ring.

15. The pipeline internal centering device according to claim 14, wherein a center of gravity of the pipeline internal centering device lies below a center point of the outer ring when in the operating position.

* * * * *